UNITED STATES PATENT OFFICE.

ALBRECHT SCHMIDT, OF HÖCHST-ON-THE-MAIN, GERMANY, ASSIGNOR TO FARB-WERKE VORM. MEISTER LUCIUS & BRÜNING, OF HÖCHST-ON-THE-MAIN, GERMANY, A CORPORATION OF GERMANY.

DRY COLLOID-LIKE INDIGO AND PROCESS OF MAKING SAME.

1,058,021.  Specification of Letters Patent.   Patented Apr. 1, 1913.

No Drawing.   Application filed July 9, 1912.   Serial No. 708,481.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Dry Colloid-Like Indigo and Processes of Making Same, of which the following is a specification.

In U. S. patent-applications Ser. Nos. 576703 filed 11th Aug. 1910 and 577200 filed 19th Aug. 1910 and Ser. No. 708,480, filed July 9, 1912, I have set forth that, and the manner whereby, a colloid-like indigo-paste can be produced which is so finely subdivided that when put under the microscope no crystals can be discerned; indeed under a microscope of such a power as is necessary for detecting tubercle-bacilli, only circular blue corpuscles can be discerned. I have made the observation that the said properties are not changed by drying the magmas or the pastes thus obtained from colloid-like indigo, at a lower or higher temperature. This is a surprising fact, because other colloid-like bodies do not generally retain their properties when dried. The very great facility with which the said bodies can be chemically reduced is also fully maintained. This observation permits of an extraordinary technical advance, since it is thus possible to obtain solid products of high percentage, which are better adapted for the trade than the other indigoes, and which very much resemble natural indigo and are therefore more salable than any other form of synthetic indigo, especially in uncivilized countries where natural indigo with its characteristic external properties is still in great demand and synthetic indigo is rejected. In preparing these products it is advantageous to add some diluent such, for instance, as glucose, kaolin, etc.

Example I: A colloid-like indigo-paste of about 30% strength, obtained according to the processes described in U. S. applications Ser. No. 576703 filed 11th Aug. 1910 or Ser. No. 577200 filed 19th Aug. 1910; also for instance in Ser. Nos. 627758 and 627759, filed 17th May 1911; and Ser. No. 645610, filed 23rd Aug. 1911, is dried in an evaporating pan *in vacuo*, or in the open air at a moderate temperature or at a higher temperature in *e. g.* the well-known "Huillard apparatus".

The granulated product obtained in either of the beforementioned ways is very easily moistened with water; when put on the tongue it adheres to it firmly like natural indigo; when triturated with water it yields a blue liquid of an entirely pigment-like character, extremely easily reducible in the cold sugar-vat.

Example II: 15 kg. of a paste of colloid-like indigo of about 34% strength is ground with about 4 kg. of grape-sugar (or any other additional substance) and about 4 kg. of china-clay, advantageously while adding some caustic-soda lye. The thick magma thus obtained is further concentrated or allowed to directly dry into pieces at ordinary or a raised temperature. If the paste is of such concentration as to be plastic, it can be molded into pieces which can be completely dried.

The new physical form of synthetic indigo is broadly claimed in my application Ser. No. 576,703, filed August 11, 1910. The new product in the form of lumps is claimed in my application Ser. No. 577,200, filed August 15, 1910.

Having now described my invention, what I claim, is:

1. The process of preparing dry, colloid-like indigo having properties like natural indigo, which consists in bringing to dryness a paste of colloid-like indigo.

2. The process of preparing dry, colloid-like indigo having properties like natural indigo, which consists in bringing to dryness a paste of colloid-like indigo to which has been added a diluting dividing agent.

3. The process of preparing dry, colloid-like indigo having properties like natural indigo, which consists in bringing to dryness, *in vacuo*, a paste of colloid-like indigo.

4. The process of preparing dry colloid-like indigo having properties like natural indigo, which consists in bringing to dryness, *in vacuo*, a paste of colloid-like indigo to which has been added a diluting dividing agent.

5. As a new article of manufacture, dry colloid-like indigo having the appearance of natural indigo, capable of being easily reduced by slightly alkaline reducing agents, very readily moistened by water, firmly adhering to the tongue like natural indigo and yielding, when triturated with water, a blue liquid of pigment-like character.

6. As a new article of manufacture dry colloid-like indigo in the form of a powder, having the appearance of natural indigo, capable of being easily reduced by slightly alkaline reducing agents, very readily moistened by water, firmly adhering to the tongue like natural indigo and yielding, when triturated with water, a blue liquid of pigment-like character.

In testimony whereof, I affix my signature in presence of two witnesses.

ALBRECHT SCHMIDT.

Witnesses:
 JEAN GRUND,
 CARL GRUND.